(12) United States Patent
Xu et al.

(10) Patent No.: US 7,301,311 B2
(45) Date of Patent: Nov. 27, 2007

(54) BRUSHLESS STARTER-GENERATOR WITH INDEPENDENTLY CONTROLLABLE EXCITER FIELD

(75) Inventors: Mingzhou Xu, Tucson, AZ (US); Dwayne M. Benson, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 93 days.

(21) Appl. No.: 11/360,116

(22) Filed: Feb. 22, 2006

(65) Prior Publication Data

US 2007/0194572 A1   Aug. 23, 2007

(51) Int. Cl.
*H02P 9/44* (2006.01)

(52) U.S. Cl. .............................. 322/59; 322/29; 322/37; 322/46

(58) Field of Classification Search .................. 322/17, 322/22, 23, 24, 29, 37, 46, 59, 60, 89
See application file for complete search history.

(56) References Cited

U.S. PATENT DOCUMENTS

| | | | |
|---|---|---|---|
| 3,676,764 A | | 7/1972 | Syverson |
| 3,823,357 A | | 7/1974 | Sapper |
| 3,908,161 A | * | 9/1975 | Messenger .................. 322/29 |
| 4,093,869 A | | 6/1978 | Hoffmann et al. |
| 4,219,739 A | | 8/1980 | Greenwell |
| 4,473,752 A | | 9/1984 | Cronin |
| 4,536,126 A | | 8/1985 | Reuther |
| 4,743,776 A | | 5/1988 | Baehler et al. |
| 4,743,777 A | | 5/1988 | Shilling et al. |
| 4,786,852 A | | 11/1988 | Cook |
| 4,830,412 A | * | 5/1989 | Raad et al. .................. 290/31 |
| 4,841,216 A | | 6/1989 | Okada et al. |
| 4,939,441 A | * | 7/1990 | Dhyanchand ............... 318/718 |
| 5,028,803 A | * | 7/1991 | Reynolds ..................... 290/31 |
| 5,068,590 A | * | 11/1991 | Glennon et al. ............. 322/10 |
| 5,850,138 A | * | 12/1998 | Adams et al. ............... 322/68 |
| 6,628,104 B2 | | 9/2003 | Yao et al. |
| 6,724,099 B2 | * | 4/2004 | Klaar ........................ 290/52 |
| 6,768,278 B2 | | 7/2004 | Xu et al. |
| 6,791,204 B2 | | 9/2004 | Sarlioglu et al. |
| 6,838,779 B1 | * | 1/2005 | Kandil et al. ................ 290/31 |

(Continued)

*Primary Examiner*—Nicholas Ponomarenko
(74) *Attorney, Agent, or Firm*—Ingrassia Fisher & Lorenz (57) ABSTRACT

A starter-generator system supplies a controllable torque to a gas turbine engine, to thereby assist in starting the gas turbine engine, by independently controlling excitation frequency and/or voltage magnitude. The starter-generator includes a multi-phase exciter stator, a rotationally mounted multi-phase exciter rotor, a multi-phase main stator, a rotationally mounted multi-phase main rotor, and an exciter controller. The rotationally mounted multi-phase exciter rotor has a plurality of exciter rotor windings wound thereon that, upon excitation thereof with a rotating electromagnetic exciter flux generated by the exciter stator, have non-rectified excitation currents induced therein. The rotationally mounted multi-phase main rotor has a plurality of main rotor windings wound thereon that are electrically connected to receive the non-rectified excitation currents induced in the exciter rotor windings and that, upon excitation thereof with a rotating electromagnetic flux and in response to the non-rectified excitation currents supplied thereto, have currents induced therein that generate a main rotor torque to thereby cause the multi-phase main rotor and the multi-phase exciter rotor to rotate. The exciter controller is electrically coupled to at least the exciter stator and is configured to selectively supply the electrical excitation thereto, to thereby selectively control the generated main rotor torque.

20 Claims, 5 Drawing Sheets

U.S. PATENT DOCUMENTS

| | | | |
|---|---|---|---|
| 6,844,707 B1 * | 1/2005 | Raad | 322/29 |
| 6,847,194 B2 * | 1/2005 | Sarlioglu et al. | 322/10 |
| 6,906,479 B2 | 6/2005 | Xu et al. | |
| 6,933,704 B2 | 8/2005 | Nelson et al. | |
| 6,995,478 B2 * | 2/2006 | Xu et al. | 290/52 |
| 7,064,455 B2 * | 6/2006 | Lando | 290/1 C |
| 7,078,826 B2 * | 7/2006 | Xu et al. | 290/52 |
| 2005/0206352 A1 | 9/2005 | Xu et al. | |
| 2005/0216225 A1 | 9/2005 | Anghel et al. | |
| 2005/0225303 A1 | 10/2005 | Xu et al. | |

\* cited by examiner

BRUSHLESS STARTER-GENERATOR WITH INDEPENDENTLY CONTROLLABLE EXCITER FIELD

TECHNICAL FIELD

The present invention relates to rotating electrical machines such as starter-generators for gas turbine engines and, more particularly, to a brushless starter-generator with an independently controllable exciter field.

BACKGROUND

An aircraft may include various types of rotating electrical machines such as, for example, generators, motors, and motor/generators. Motor/generators are used as starter-generators in some aircraft, since this type of rotating electrical machine may be operated in both a motor mode and a generator mode. A starter-generator may be used to start the engines or auxiliary power unit (APU) of an aircraft when operating as a motor, and to supply electrical power to the aircraft power distribution system when operating as a generator. Thus, when operating as a motor, a starter-generator may be used to start the engines.

One particular type of aircraft starter-generator includes three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating in a generator mode. Conversely, if the starter-generator is operating in a motor mode, the control device supplies AC power.

If the starter-generator is operating in the generator mode, DC current from the regulator or control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating in the motor mode, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

The above-described starter-generator can potentially provide overall weight savings and improved operating costs in, for example, a More Electric Aircraft (MEA) system architecture. It is noted, however, that the starter-generator in such architectures may be used to start the aircraft main engines, and may thus need to generate a starting torque that is significantly higher than for existing auxiliary power unit (APU) starter-generator applications. Current starter-generators typically include relatively complex and heavy power electronics circuits in the control device. For example, some control devices may include inverters, for converting DC to AC power, rectifiers, for converting AC power to DC power, and potentially complex voltage and frequency control circuits, which can increase overall complexity, cost, and maintenance. Although brush-type DC machines may alleviate the need for some of these complex and heavy electronic circuits, these also suffer certain drawbacks. For example, the brushes tend to wear fairly quickly, which can reduce machine reliability and increase the need for periodic maintenance and cleaning. Some brush-type DC machines can also suffer what is known as torque ripple during startup. In some instances, the torque ripple can be large, which can result in poor starter performance.

Hence, there is a need for a starter-generator that does not rely on relatively complex and heavy inverters and frequency control circuits for proper operation, and/or does not suffer reduced reliability from brush wear, and/or the need for potentially frequent maintenance and cleaning, and/or does not experience significant torque ripple during startup. The present invention addresses one or more of these needs.

BRIEF SUMMARY

The present invention provides a starter-generator system that supplies a controllable torque to a gas turbine engine, to thereby assist in starting the gas turbine engine, by independently controlling excitation frequency and/or voltage magnitude.

In one embodiment, and by way of example only, a starter-generator includes a multi-phase exciter stator, a rotationally mounted multi-phase exciter rotor, a multi-phase main stator, a rotationally mounted multi-phase main rotor, and an exciter controller. The multi-phase exciter stator has a plurality of exciter stator windings wound thereon that, upon electrical excitation thereof, generate a rotating exciter stator electromagnetic flux. The rotationally mounted multi-phase exciter rotor is disposed at least partially within the multi-phase exciter stator, and has a plurality of exciter rotor windings wound thereon that, upon excitation thereof with the rotating exciter stator electromagnetic exciter flux, have non-rectified excitation currents induced therein. The multi-phase main stator has a plurality of main stator windings wound thereon that, upon electrical excitation thereof from main AC power source, generate a rotating main stator electromagnetic flux. The rotationally mounted multi-phase main rotor is disposed at least partially within the multi-phase main stator and is mechanically coupled to the exciter rotor. The multi-phase main rotor has a plurality of main rotor windings wound thereon that are electrically connected to receive the non-rectified excitation currents induced in the exciter rotor windings and that, upon excitation thereof with the main stator rotating electromagnetic flux and in response to the non-rectified excitation currents supplied thereto, have currents induced therein that generate a main rotor torque to thereby cause the multi-phase main rotor and the multi-phase exciter rotor to rotate. The exciter controller is electrically coupled to at least the exciter stator windings and is configured to selectively supply the electrical excitation thereto, to thereby selectively control the generated main rotor torque.

In yet another exemplary embodiment, a starter-generator includes a multi-phase exciter stator, a multi-phase exciter rotor, a multi-phase main stator, and a multi-phase main rotor. The multi-phase exciter stator has a plurality of exciter stator windings wound thereon. The multi-phase exciter rotor is rotationally mounted, is disposed at least partially within the multi-phase exciter stator, and has a plurality of exciter rotor windings wound thereon. The multi-phase main stator has a plurality of main stator windings wound thereon that, upon electrical excitation thereof from a main AC power source, generate a rotating main stator electromagnetic flux. The multi-phase main rotor is rotationally mounted, is disposed at least partially within the multi-phase main stator, and is mechanically coupled to the exciter rotor. The multi-phase main rotor further has a plurality of main rotor windings wound thereon that are directly connected to the exciter rotor windings and that, upon excitation thereof with the main stator rotating electromagnetic flux, have currents induced therein that generate a main rotor torque to thereby cause the multi-phase main rotor and the multi-phase exciter rotor to rotate.

Other independent features and advantages of the preferred starter-generator system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although the starter-generator is described herein as being used with, for example, an aircraft gas turbine engine, it will be appreciated that may be used as a starter-generator with gas turbine engines in numerous other environments included, for example, space, marine, land, or other vehicle-related applications where gas turbine engines are used.

Figure 1:
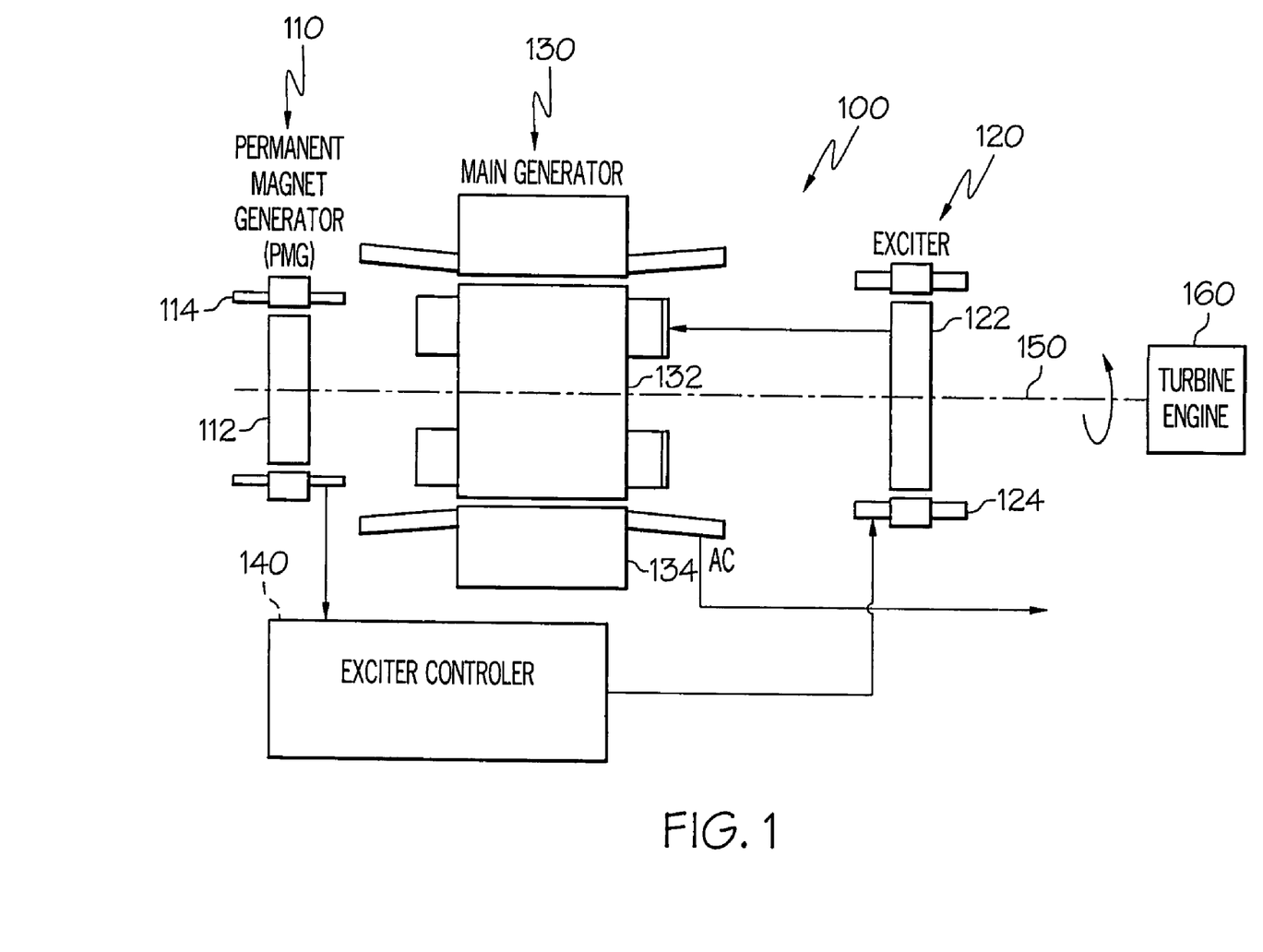
FIG. 1 is a functional block diagram of an exemplary high speed starter-generator system according to an embodiment of the present invention when operating in a generator mode.

Turning now to the description and with reference first to FIG. 1, a functional schematic block diagram of an exemplary starter-generator system 100 for use with, for example, an aircraft gas turbine engine, is shown. This exemplary starter-generator system 100 includes a permanent magnet generator (PMG) 110, which includes a PMG rotor 112 and a PMG stator 114, an exciter 120, which includes an exciter rotor 122 and an exciter stator 124, a main starter-generator 130, which includes a main rotor 132 and a main stator 134, and an exciter controller 140. It will be appreciated that the starter-generator system 100 may include one or more additional components, sensors, or controllers. However, a description of these additional components, sensors, and controllers, if included, is not needed, and will therefore not be further depicted or described.

In the depicted embodiment, the PMG rotor 112, the exciter rotor 122, and the main rotor 132 are all mounted on a common shaft 150. When the starter-generator system 100 is operating in a generator mode, the shaft 150 receives a rotational drive force from, for example, an aircraft gas turbine engine 160, which causes the PMG rotor 112, the exciter rotor 122, and the main rotor 132 to all rotate at the same rotational speed. The rotational speed of the engine 160, and thus these starter-generator system components, may vary. For example, the rotational speed may vary in the range of about 1,200 rpm to about 4,800 rpm. It will be appreciated that this rotational speed range is merely exemplary, and that various other speed ranges may be used. It will be further appreciated that the relative positions of the PMG 110, the exciter 120, and the main starter-generator 130 may differ. For example, the exciter generator 120 could be located between PMG 110 and main starter-generator 130, just to describe a single alternative configuration.

No matter the specific rotational speed range, it will be appreciated that as the PMG rotor 112 rotates, the PMG 110 generates and supplies, via the PMG stator 114, AC power to the exciter controller 140. In response, the exciter controller 140 supplies AC power to the exciter stator 124. In turn, this causes the exciter rotor 122 to supply AC power to the main rotor 132. As the main rotor 132 rotates, it induces AC current in a main stator 134, which is in turn supplied to one or more loads.

Figure 2:
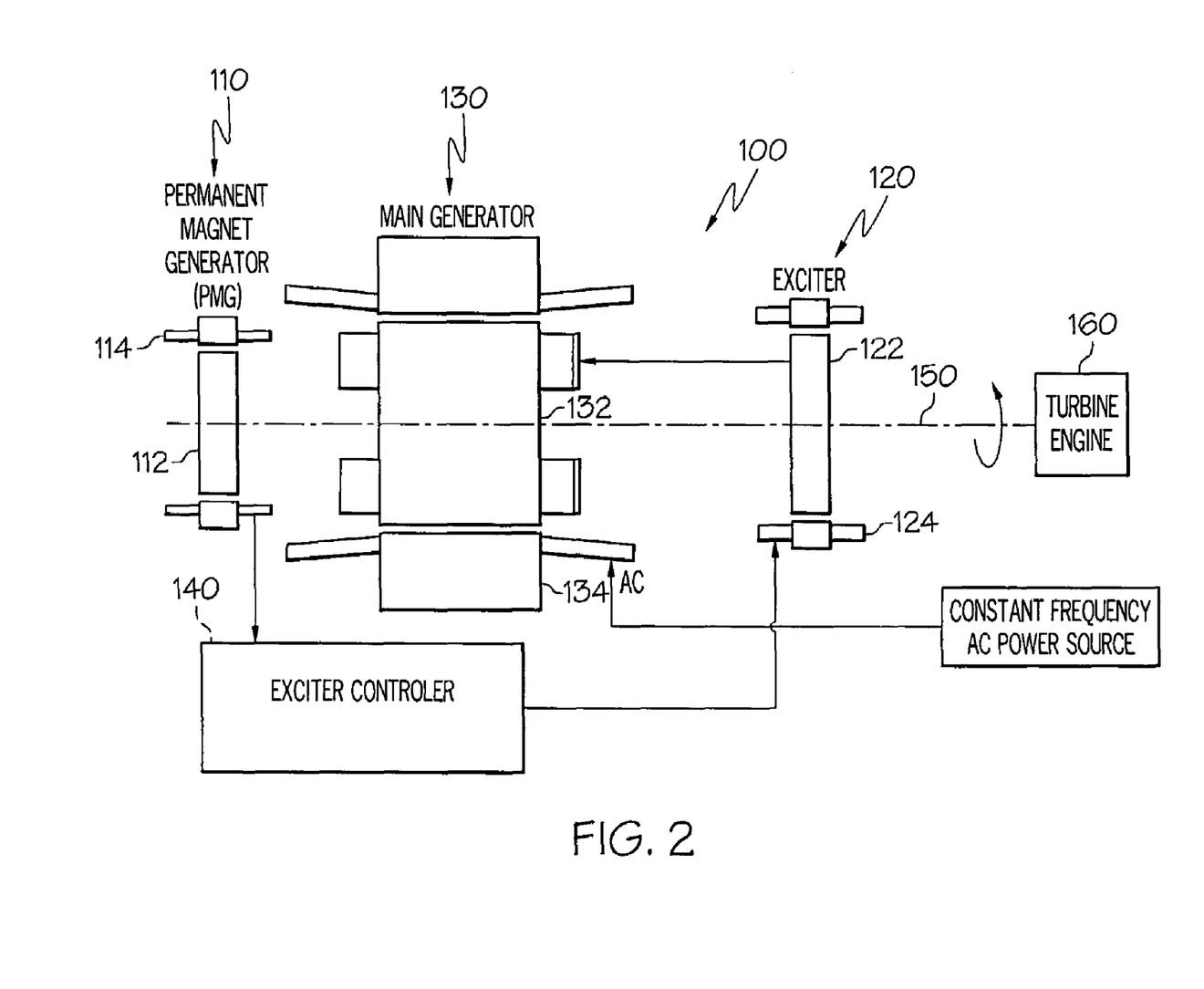
FIG. 2 is a functional block diagram of the exemplary high speed starter-generator system of FIG. 1, when operating in a motor mode.

As depicted in FIG. 2, when the starter-generator system 100 is operating in the motor mode, the main stator 134 is coupled to receive AC power from a constant frequency AC power source 202. It will be appreciated that the constant frequency AC power source 202 may vary, and may include, for example, an aircraft auxiliary power unit (APU) or an external power source. No matter the specific source of the constant frequency AC power, it will be appreciated that the AC power generates a rotating magnetic field in windings of the main stator 134. This rotating magnetic field induces currents in windings of the main rotor 132. As will be described further below, the induced currents are also supplied to windings of the exciter rotor 122. In any case, the interaction of the induced currents and rotating magnetic field generates a torque and causes the main rotor 132 to rotate and supply rotational power to the engine 160. Because the exciter rotor 122, and the PMG rotor 112 are also mounted on the shaft 150, these components also rotate. As will also be described further below, during motor mode operation, the exciter controller 140 is configured to selectively supply AC power to the exciter stator 124, which in turn causes the exciter rotor 122 to supply AC power to the main rotor 132, to thereby control the torque that the main rotor 132 generates.

Figure 3:
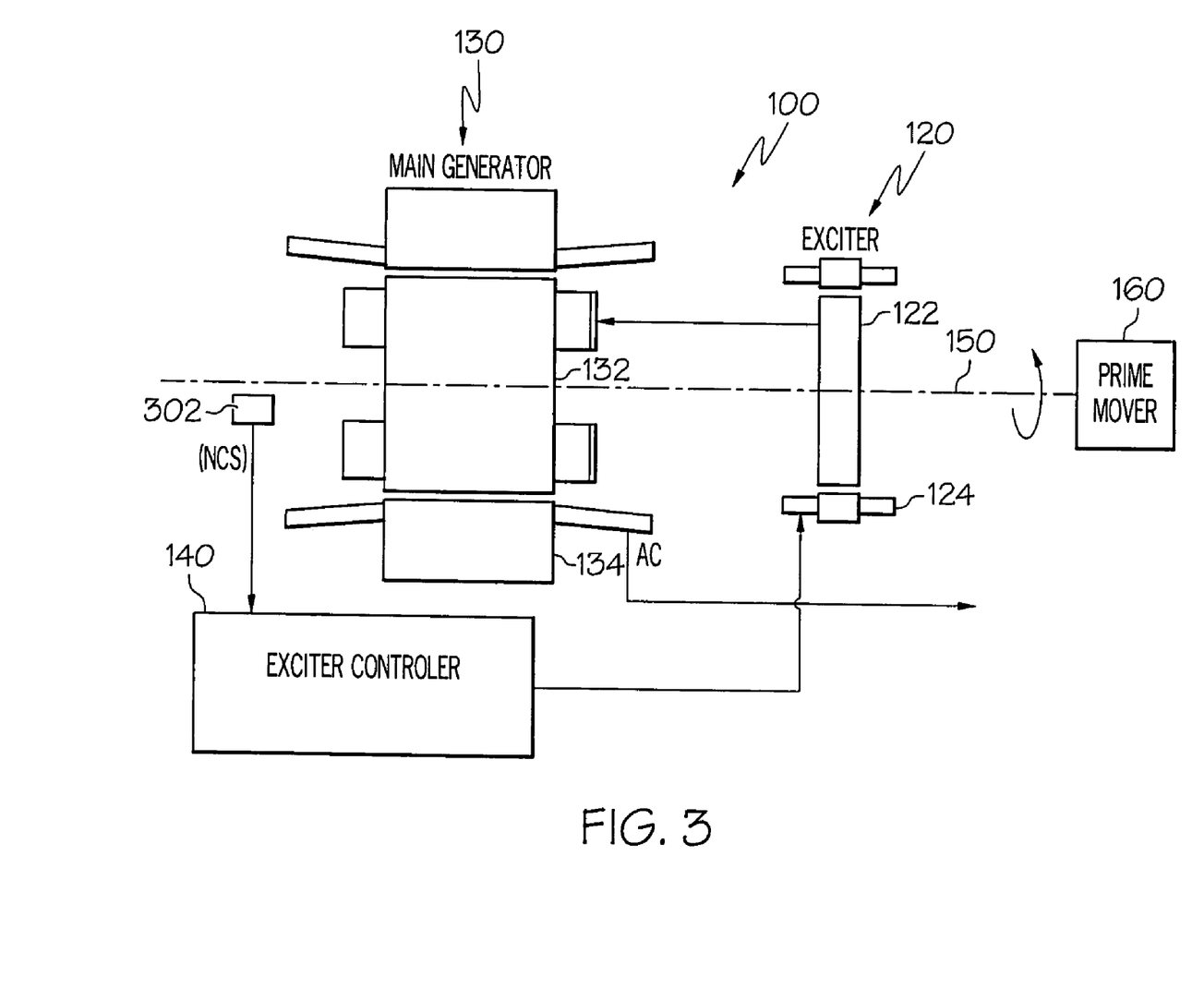
FIG. 3 is a functional block diagram of the exemplary high speed starter-generator system of FIGS. 1 and 2, according to an alternative embodiment of the present invention.

Before proceeding further, it will be appreciated that although the starter-generator system 100 described above is implemented with a PMG 110, the starter-generator system 100 could alternatively be implemented without the PMG 110. In this alternative embodiment, which is shown in FIG. 3, the starter-generator system 100 includes a speed sensor 302 rather than the PMG 110. The speed sensor 302, which may be implemented using any one of numerous types of rotational speed sensors, is typically used during operation in the generator mode and is configured to sense the rotational speed of the shaft 150 and supply a speed signal ($N_S$) representative thereof to the exciter controller 140. Although the exciter controller 140 in the alternative embodiment also supplies AC power to the exciter stator 124 during generator mode operation, it does so in response to the speed signal from the speed sensor 302 rather than in response to the AC power supplied from the PMG 110. In both embodiments, however, it is noted that the signal supplied to the exciter controller 140, be it the AC power signal from the PMG 110 or the speed signal from the speed sensor 302, is representative of shaft rotational speed. It is additionally noted that in both embodiments, when the starter-generator is operating in the motor mode, the exciter controller 140 can be configured to receive the AC power signal from the PMG 110, the speed signal from the speed sensor 302, or no signal at all that is representative of shaft rotational speed.

Figure 4:
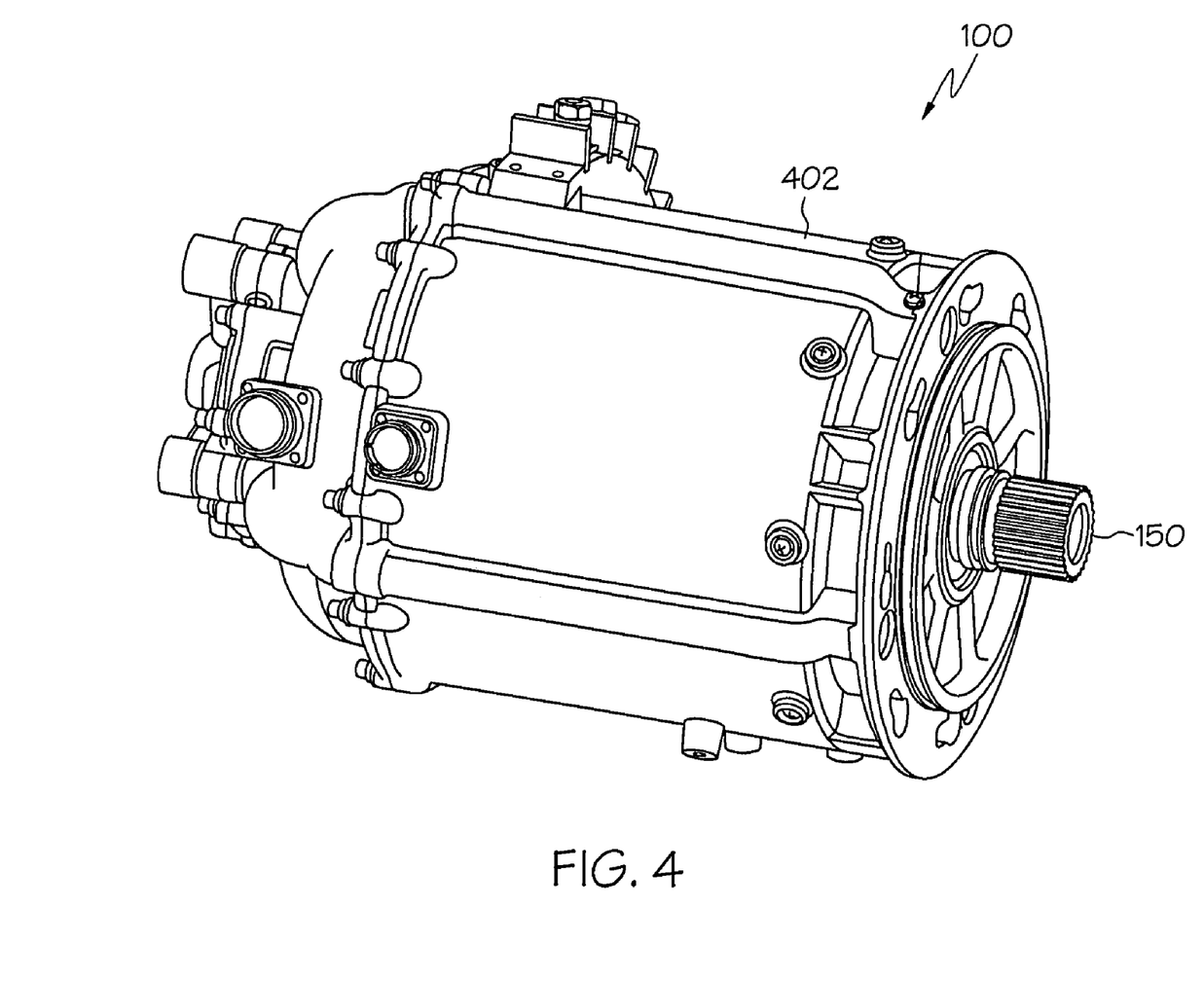
FIG. 4 is a perspective view of a physical embodiment of the high speed starter-generators shown in FIGS. 1-3.

No matter whether the starter-generator system 100 is implemented as shown in FIGS. 1 and 2, or FIG. 3, the starter-generator system 100, or at least portions of the system 100, is preferably housed within a generator housing 402, a perspective view of which is illustrated in FIG. 4.

The exemplary starter-generator systems 100 described above and shown in FIGS. 1-3 are, in some aspects, configured similar to conventional brushless starter-generators; however, each is quite different in certain other aspects. For example, and with reference now to FIG. 5, it is seen that the exciter rotor 122 and the main stator 134 are both implemented similar to a conventional brushless AC generator, whereas the exciter stator 124 and main rotor 132 are not. In particular, the exciter rotor 122 and the main stator 134, as in a conventional brushless AC starter-generator, are both implemented with multi-phase (e.g., three-phase) exciter rotor windings 502 and multi-phase (e.g., three-phase) main stator windings 504, respectively. Conversely, the exciter stator 124 and the main rotor 132, rather than being implemented with single phase windings, as in a conventional brushless AC starter-generator, are implemented with multi-phase (e.g., three-phase) exciter stator windings 506 and multi-phase (e.g., three-phase) main rotor field windings 508, respectively. Another difference from a conventional brushless AC starter-generator system is that there are no rotating rectifier assemblies coupled between the exciter rotor 122 and the main rotor 132. Rather, the exciter rotor windings 502 are directly electrically coupled to the main rotor field windings 508.

Figure 5:
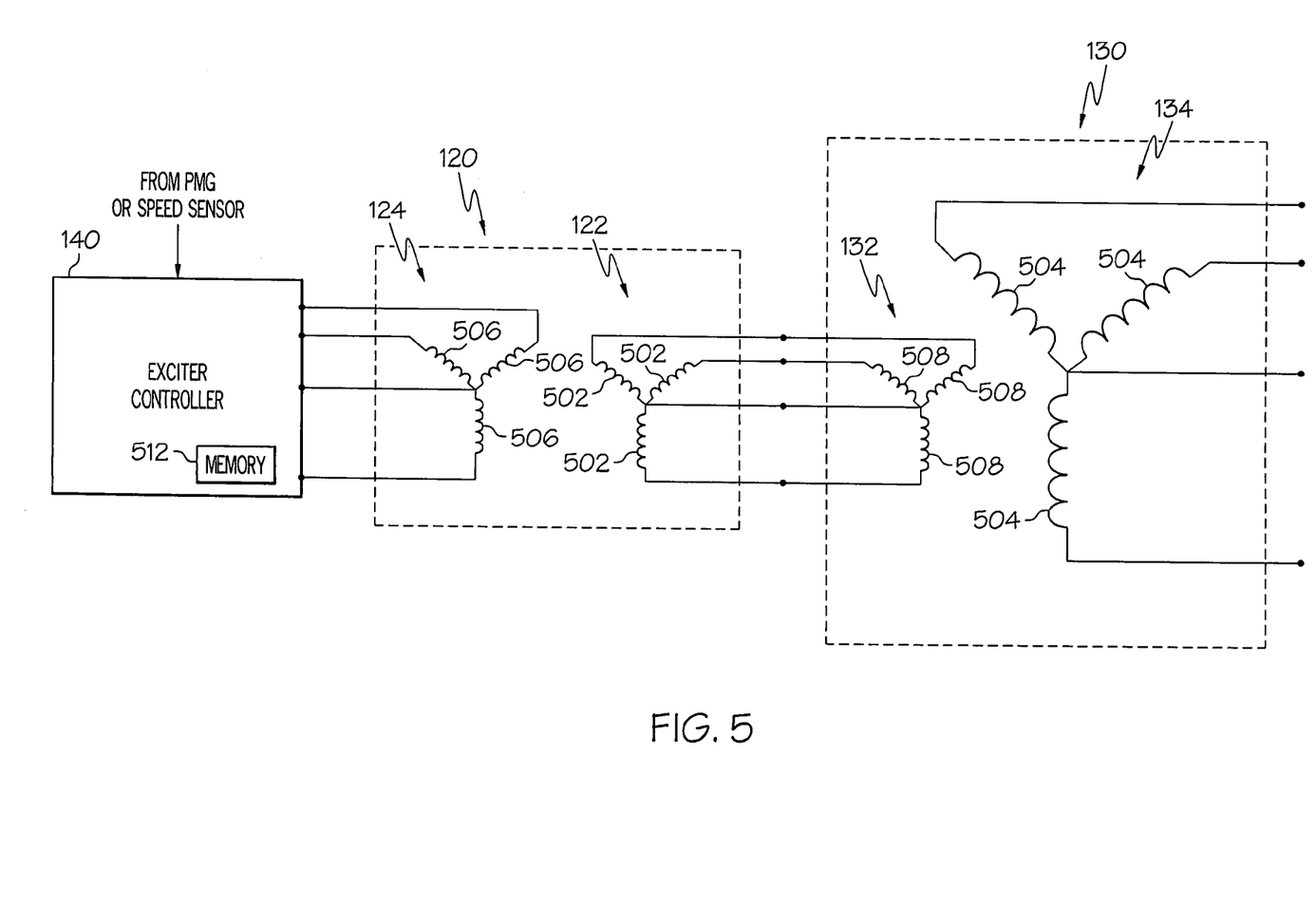
FIG. 5 is a schematic representation of at least a portion of the high speed starter-generators of FIGS. 1-3.

The exciter controller 140 is implemented, at least in part, as a power converter circuit that is configured to supply variable-frequency, variable-voltage, three-phase excitation to the exciter stator windings 506. It will be appreciated that that when the starter-generator 100 is operating in the motor mode, the exciter controller 140, as mentioned above, may be configured to supply excitation to the exciter stator windings 506, based on one or more predetermined torque profiles stored in a memory 512 within, or external to, the exciter controller 140, or in response to a signal supplied to the exciter controller 140 from either the PMG 110 or the speed sensor 202, or one or more combinations of stored profiles and signals supplied to the exciter controller 140.

The frequency and phase sequence of the excitation that the exciter controller 140 supplies to the exciter stator windings 506 when the starter-generator system 100 is operating in the generator mode depends upon the rotational speed at which the engine 160 is rotating the shaft 150 (and thus the PMG rotor 112, the exciter rotor 122, and the main rotor 132), upon the number of poles with which the exciter 120 and the main starter-generator 130 are implemented, and upon the desired frequency that the starter-generator system 100 is to supply. A detailed description of the operation of the starter-generator system 100 in the generator mode is described in more detail in U.S. patent application Ser. No. 11/111,084, filed Apr. 20, 2005, and assigned to the assignee of the present invention. Hence, a description of operation in the generator mode will not be included herein. Rather, only a description of the operation of the starter-generator system 100 in the motor mode will be provided.

The frequency and voltage of the excitation that the exciter controller 140 supplies to the exciter stator windings 506 when the starter-generator system 100 is operating in the motor mode depends upon the torque to be generated and supplied to the engine 160, upon the number of poles with which the exciter 120 and the main starter-generator 130 are implemented, and upon the frequency and voltage supplied to the main stator 134. For example, in a particular physical embodiment, the exciter 120 is implemented as a 10-pole machine, the main starter-generator 130 is implemented as a 4-pole machine, and the constant frequency supplied to the main stator 134 is 400 Hz. It will be appreciated, however, that this is merely exemplary of a particular embodiment, and that the exciter 120 and main starter-generator 130 could be implemented with different numbers of poles, and the main stator could be supplied with AC power at a different, albeit constant, frequency. It will additionally be appreciated that in some embodiments, the starter-generator system 100 may be operated in the motor mode without the exciter controller 140 supplying any excitation to the exciter stator windings 506, during either a portion of an engine start sequence or throughout an entire engine start sequence.

In addition to the above, it will be appreciated that the starter-generator system 100, when operating in the motor mode, may be configured to operate as either a synchronous motor or an asynchronous motor. As is generally known, a synchronous motor is one in which the rotational speed of the main rotor 132 matches the rotational speed of the rotating magnetic flux in the main stator 134, and an asynchronous motor is one in which the rotational speed of the main rotor 132 is less than the rotational speed of the rotating magnetic field in the main stator 134. It will be further appreciated that the starter-generator system 100 may be configured to operate as a synchronous motor during one or more phases of an engine start sequence, and as an asynchronous motor during one or more different phases of an engine start sequence.

When the starter-generator system 100 is configured to operate asynchronously, the torque generated by the main rotor 132 and supplied to the engine 160 may be controlled by controlling the supply voltage magnitude from the constant frequency AC power source to the main starter-generator stator 134, controlling the frequency of the excitation supplied from the exciter controller 140 to the exciter stator windings 506, controlling the voltage magnitude of the excitation supplied from the exciter controller to the exciter stator windings 506, or controlling various combinations of these parameters. Conversely, when the starter-generator system 100 is configured to operate synchronously, the torque generated thereby and supplied to the engine 160 may be controlled by controlling both the frequency and the voltage magnitude of the excitation supplied from the exciter controller 140 to the exciter stator windings 506.

When the starter-generator system 100 is configured to operate either synchronously or asynchronously, and the torque is being controlled by the exciter controller 140, the main rotor windings 508 will be excited by the rotating electromagnetic field that is generated by the main stator windings 504 and will be supplied with non-rectified excitation currents induced in the exciter rotor windings 502. The rotating electromagnetic field excitation will, as is generally known, induce currents in the main rotor windings 508. The induced currents, in combination with the non-rectified currents supplied to the main rotor windings 508 from the exciter rotor windings 502, will generate a torque and cause the main rotor 132, exciter rotor 122, and shaft 150 to rotate and drive the engine 160. Thus, by controlling the non-rectified currents supplied to the main rotor windings 508 from the exciter rotor windings 502, by varying either the frequency or the voltage magnitude of the excitation supplied to the exciter stator windings 506 when operated asynchronously, or by varying both the frequency and the voltage magnitude of the excitation supplied to the stator windings 506 when operated synchronously, the generated torque is controlled.

The AC starter-generator system described herein generates a torque for supply to a gas turbine engine when the starter-generator is operating in a motor mode, by independently controlling the field rotational speeds. The disclosed starter-generator system can be implemented with no restrictions on the number of poles for the exciter or main starter-generator.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A starter-generator, comprising:
   a multi-phase exciter stator having a plurality of exciter stator windings wound thereon that, upon electrical excitation thereof, generate a rotating exciter stator electromagnetic flux;
   a rotationally mounted multi-phase exciter rotor disposed at least partially within the multi-phase exciter stator, the multi-phase exciter rotor having a plurality of exciter rotor windings wound thereon that, upon excitation thereof with the rotating exciter stator electromagnetic exciter flux, have non-rectified excitation currents induced therein;
   a multi-phase main stator having a plurality of main stator windings wound thereon that, upon electrical excitation thereof from a main AC power source, generate a rotating main stator electromagnetic flux;
   a rotationally mounted multi-phase main rotor disposed at least partially within the multi-phase main stator and mechanically coupled to the exciter rotor, the multi-phase main rotor having a plurality of main rotor windings wound thereon that are electrically connected to receive the non-rectified excitation currents induced in the exciter rotor windings and that, upon excitation thereof with the main stator rotating electromagnetic flux and in response to the non-rectified excitation currents supplied thereto, have currents induced therein that generate a main rotor torque to thereby cause the multi-phase main rotor and the multi-phase exciter rotor to rotate; and
   an exciter controller electrically coupled to at least the exciter stator windings and configured to selectively supply the electrical excitation thereto, to thereby selectively control the generated main rotor torque.

2. The starter-generator of claim 1, wherein:
   the currents induced in the main rotor windings further generate a main rotor flux that rotates at a rotational rotor flux speed; and
   the exciter controller is configured to selectively control the generated main rotor torque by selectively supplying electrical excitation to the exciter stator windings that controls the rotational rotor flux speed.

3. The starter-generator of claim 2, wherein the exciter controller is configured to:
   selectively supply the electrical excitation as multi-phase AC excitation having a frequency and a phase sequence; and
   control the frequency and phase sequence to thereby control the rotational rotor flux speed.

4. The starter-generator of claim 3, wherein:
   the multi-phase main rotor and the multi-phase exciter rotor, in response to generation of the main rotor torque, rotate in a first direction; and
   the exciter controller is configured to supply the multi-phase AC electrical excitation to the exciter stator windings in a phase sequence that is in either the first direction or a second direction opposite the first direction.

5. The starter-generator of claim 3, wherein:
   the rotating main stator electromagnetic flux rotates at a rotational stator flux speed; and
   the exciter controller is configured to selectively supply the electrical excitation to the exciter stator windings to thereby control the rotational rotor flux speed to be substantially equal to or less than the rotational stator flux speed.

6. The starter-generator of claim 1, wherein the main AC power source is a constant frequency AC power source.

7. The starter-generator of claim 1, further comprising:
   a permanent magnet generator (PMG) mounted on the shaft and configured, upon rotation thereof, to supply a signal to the exciter controller that is representative of multi-phase main rotor rotational speed,
   wherein the exciter controller determines the multi-phase main rotor rotational speed based at least in part on the signal supplied from the PMG.

8. The starter-generator of claim 1, further comprising:
   a speed sensor configured to sense multi-phase main rotor rotational speed and supply a speed signal representative thereof to the exciter controller,
   wherein the exciter controller determines the multi-phase main rotor rotational speed based at least in part on the speed signal.

9. The starter-generator of claim 1, wherein:
   the main generator rotor is implemented as a N-pole rotor;
   the exciter rotor is implemented as a M-pole rotor; and
   N and M are each integers greater than one.

10. The starter-generator of claim 7, wherein N is unequal to M.

11. The starter-generator of claim 7, wherein N is equal to M.

12. The starter-generator of claim 1, further comprising:
    a generator housing enclosing at least portions of the multi-phase main stator, the multi-phase main rotor, the multi-phase exciter rotor, and the multi-phase exciter stator; and
    a shaft rotationally mounted within the housing, the shaft supporting at least the multi-phase main rotor and the multi-phase exciter rotor thereon and configured to supply a drive force upon rotation thereof.

13. The starter-generator of claim 12, further comprising:
    a gas turbine engine coupled to the shaft and configured to receive a drive force therefrom.

14. A starter-generator, comprising:
    a housing;
    a shaft rotationally mounted within the housing and configured to rotate;
    a multi-phase exciter stator mounted within the housing and having a plurality of exciter stator windings wound thereon that, upon electrical excitation thereof, generate a rotating exciter stator electromagnetic flux;
    multi-phase exciter rotor mounted on the shaft and disposed at least partially within the multi-phase exciter stator, the multi-phase exciter rotor having a plurality of exciter rotor windings wound thereon that, upon excitation thereof with the rotating exciter stator electromagnetic exciter flux, have non-rectified excitation currents induced therein;

a multi-phase main stator mounted within the housing and having a plurality of main stator windings wound thereon that, upon electrical excitation thereof from a main AC power source, generate a rotating main stator electromagnetic flux;

a multi-phase main rotor mounted on the shaft, disposed at least partially within the multi-phase main stator, and mechanically coupled to the exciter rotor, the multi-phase main rotor having a plurality of main rotor windings wound thereon that are electrically connected to receive the non-rectified excitation currents induced in the exciter rotor windings and that, upon excitation thereof with the main stator rotating electromagnetic flux and in response to the non-rectified excitation currents supplied thereto, have currents induced therein that generate a main rotor torque to thereby cause the multi-phase main rotor and the multi-phase exciter rotor to rotate; and an exciter controller electrically coupled to at least the exciter stator windings and configured to selectively supply the electrical excitation thereto, to thereby selectively control the generated main rotor torque.

15. The starter-generator of claim 14, wherein:
the currents induced in the main rotor windings further generate a main rotor flux that rotates at a rotational rotor flux speed; and
the exciter controller is configured to selectively control the generated main rotor torque by selectively supplying electrical excitation to the exciter stator windings that controls the rotational rotor flux speed.

16. The starter-generator of claim 15, wherein the exciter controller is configured to:
selectively supply the electrical excitation as multi-phase AC excitation having a frequency and a phase sequence; and
control the frequency and phase sequence to thereby control the rotational rotor flux speed.

17. The starter-generator of claim 16, wherein:
the multi-phase main rotor and the multi-phase exciter rotor, in response to generation of the main rotor torque, rotate in a first direction; and
the exciter controller is configured to supply the multi-phase AC electrical excitation to the exciter stator windings in a phase sequence that is in either the first direction or a second direction opposite the first direction.

18. The starter-generator of claim 16, wherein:
the rotating main stator electromagnetic flux rotates at a rotational stator flux speed; and
the exciter controller is configured to selectively supply the electrical excitation to the exciter stator windings to thereby control the rotational rotor flux speed to be substantially equal to or less than the rotational stator flux speed.

19. The starter-generator of claim 14, wherein the main AC power source is a constant frequency AC power source.

20. A starter-generator, comprising:
a multi-phase exciter stator having a plurality of exciter stator windings wound thereon;
a rotationally mounted multi-phase exciter rotor disposed at least partially within the multi-phase exciter stator, the multi-phase exciter rotor having a plurality of exciter rotor windings wound thereon;
a multi-phase main stator having a plurality of main stator windings wound thereon that, upon electrical excitation thereof from a main AC power source, generate a rotating main stator electromagnetic flux; and
a rotationally mounted multi-phase main rotor disposed at least partially within the multi-phase main stator and mechanically coupled to the exciter rotor, the multi-phase main rotor having a plurality of main rotor windings wound thereon that are directly connected to the exciter rotor windings and that, upon excitation thereof with the main stator rotating electromagnetic flux, have currents induced therein that generate a main rotor torque to thereby cause the multi-phase main rotor and the multi-phase exciter rotor to rotate.

* * * * *